United States Patent
Kim et al.

(10) Patent No.: US 11,857,891 B2
(45) Date of Patent: Jan. 2, 2024

(54) STEAM GENERATING DEVICE, AND FUEL CELL SYSTEM INCLUDING THE SAME

(71) Applicant: MICO POWER LTD., Gyeonggi-do (KR)

(72) Inventors: Youn Kil Kim, Gyeonggi-do (KR); Yeong Bin Kim, Gyeonggi-do (KR); Jun Woo Lee, Gyeonggi-do (KR)

(73) Assignee: MICO POWER LTD., Gyeonggi-Do (KR)

( * ) Notice: Subject to any disclaimer, the term of this patent is extended or adjusted under 35 U.S.C. 154(b) by 219 days.

(21) Appl. No.: 17/434,673

(22) PCT Filed: Feb. 27, 2020

(86) PCT No.: PCT/KR2020/002803
§ 371 (c)(1),
(2) Date: Aug. 27, 2021

(87) PCT Pub. No.: WO2020/175930
PCT Pub. Date: Sep. 3, 2020

(65) Prior Publication Data
US 2022/0193573 A1    Jun. 23, 2022

(30) Foreign Application Priority Data
Feb. 27, 2019 (KR) .......... 10-2019-0022919

(51) Int. Cl.
*B01D 1/02* (2006.01)
*B01B 1/00* (2006.01)
(Continued)

(52) U.S. Cl.
CPC ............... *B01D 1/02* (2013.01); *B01B 1/005* (2013.01); *B01J 19/24* (2013.01); *C01B 3/34* (2013.01);
(Continued)

(58) Field of Classification Search
CPC .. B01D 1/02; B01B 1/005; B01J 19/24; B01J 2219/0009; B01J 2219/00157; C01B 3/34;
(Continued)

(56) References Cited

U.S. PATENT DOCUMENTS 5,617,737 A * 4/1997 Christensen ............ F28D 7/024
62/487
11,002,487 B2 * 5/2021 Koester ................... F28D 7/024
(Continued)

FOREIGN PATENT DOCUMENTS

EP        0520097 B1 * 11/1995
JP     2004-014141 A    1/2004
(Continued)

OTHER PUBLICATIONS

International Search Report and Written Opinion for International Application No. PCT/KR2020/002803, dated Jun. 26, 2020. (English Translation of ISR).

*Primary Examiner* — Matthew J Merkling
(74) *Attorney, Agent, or Firm* — NORTON ROSE FULBRIGHT US LLP (57) ABSTRACT

A water vapor generating apparatus includes a chamber having an inner space defined therein; a space partitioning member including a first partitioning portion, and a second partitioning portion, wherein the space partitioning member divides the inner space into a water vapor discharge space and a heating space; a first evaporation tube disposed in the heating space and in a coil shape surrounding the second partitioning portion; a second evaporation tube disposed in the heating space and in a coil shape surrounding the first evaporation tube; an inner cage disposed between the first evaporation tube and the second evaporation tube, wherein the inner cage presses against the first evaporation tube toward the second partitioning portion; and an outer cage
(Continued)

surrounding the second evaporation tube, wherein the outer cage presses against the second evaporation tube toward the first evaporation tube.

11 Claims, 6 Drawing Sheets

(51) Int. Cl.
  *B01J 19/24* (2006.01)
  *C01B 3/34* (2006.01)
  *H01M 8/0612* (2016.01)
(52) U.S. Cl.
  CPC .... *H01M 8/0618* (2013.01); *B01J 2219/0009* (2013.01); *B01J 2219/00157* (2013.01); *C01B 2203/0216* (2013.01); *C01B 2203/066* (2013.01); *C01B 2203/0811* (2013.01)

(58) Field of Classification Search
  CPC ...... C01B 2203/0216; C01B 2203/066; C01B 2203/0811; H01M 8/0618
  See application file for complete search history.

(56) References Cited

U.S. PATENT DOCUMENTS

| | | | |
|---|---|---|---|
| 11,071,925 B2* | 7/2021 | Ling | ............... B01D 3/00 |
| 2018/0126296 A1* | 5/2018 | Choi | ............... H01M 8/0618 |
| 2019/0178109 A1* | 6/2019 | Cocuzza | ............ F22G 3/002 |

FOREIGN PATENT DOCUMENTS

| | | |
|---|---|---|
| JP | 2015-136658 A | 7/2015 |
| KR | 10-2008-0078142 A | 8/2008 |
| KR | 10-2014-0082240 A | 7/2014 |
| KR | 10-2016-0123751 A | 10/2016 |

\* cited by examiner

STEAM GENERATING DEVICE, AND FUEL CELL SYSTEM INCLUDING THE SAME

CROSS REFERENCE TO RELATED APPLICATIONS

This application is a national phase under 35 U.S.C. § 371 of International Application No. PCT/KR2020/002803, filed Feb. 27, 2020, which claims the benefit of priority to Korean Patent Application Serial No. 10-2019-0022919, filed Feb. 27, 2019. The contents of the referenced applications are incorporated into the present application by reference.

FIELD OF THE INVENTION

The present disclosure relates to a water vapor generating apparatus that stably supplies water vapor to a fuel reformer for reforming hydrocarbon fuel and to a fuel cell system including the same.

DESCRIPTION OF RELATED ART

A fuel cell uses reaction of hydrogen and oxygen to generate electricity. In a fuel cell (SOFC), hydrogen is generated via external reforming of hydrocarbon-based fuel such as city gas, and then is used as a fuel for the fuel cell. This fuel cell is the most efficient when hydrogen is directly used. For this purpose, a hydrogen storage tank is directly installed where the fuel cell is installed. However, this causes many safety problems. Therefore, currently, hydrogen is generated by reforming hydrocarbon fuel and is used as the fuel for the fuel cell.

A method of reforming the hydrocarbon fuel includes a water vapor based reforming method which generates hydrogen by reacting water vapor with the hydrocarbon fuel. In this water vapor based reforming method, hydrogen, carbon monoxide, carbon dioxide, etc. are mainly generated via the reaction of water vapor and hydrocarbon fuel, and are supplied as fuel gas to the fuel cell.

However, in this water vapor based reforming method, when an amount of the water vapor is smaller compared to an amount of the hydrocarbon fuel or a reaction temperature is lowered, carbon (C) that may rapidly damage an electrode of the fuel cell is generated by the reaction therebetween. Therefore, in order to prevent the generation of carbon (C), it is necessary to stably and uniformly provide the water vapor to the fuel reformer where the reaction of the hydrocarbon fuel and the water vapor occurs.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a water vapor generating apparatus that may stably and uniformly provide water vapor to a fuel reformer.

Another purpose of the present disclosure is to provide a fuel cell system including the water vapor generating apparatus.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a water vapor generating apparatus comprising: a chamber having an inner space defined therein; a space partitioning member including a first partitioning portion coupled to a sidewall of the chamber and having an opening formed in a middle portion thereof, and a second partitioning portion extending downwardly from the opening, wherein the space partitioning member divides the inner space into a water vapor discharge space and a heating space; a first evaporation tube disposed in the heating space and in a coil shape surrounding the second partitioning portion, wherein the first evaporation tube has a first end disposed outside the chamber and connected to a water supply device and a second end positioned in the water vapor discharge space; a second evaporation tube disposed in the heating space and in a coil shape surrounding the first evaporation tube, wherein the second evaporation tube has a third end connected to the water supply device and a fourth end positioned in the water vapor discharge space; an inner cage disposed between the first evaporation tube and the second evaporation tube, wherein the inner cage presses against the first evaporation tube toward the second partitioning portion; and an outer cage surrounding the second evaporation tube, wherein the outer cage presses against the second evaporation tube toward the first evaporation tube.

In one implementation of the apparatus, the first evaporation tube or the second evaporation tube is embodied as a bellows-type tube.

In one implementation of the apparatus, the apparatus further comprises a water vapor pressure-change reduction member disposed inside the first evaporation tube or the second evaporation tube and having a porous structure through which water vapor passes.

In one implementation of the apparatus, the space partitioning member further includes a plurality of first guide protrusions protruding from a surface of the second partitioning portion to support the first evaporation tube.

In one implementation of the apparatus, the inner cage includes: a first upper frame having a circular ring shape of a first diameter and surrounding the first evaporation tube; a first lower frame having a circular ring shape of the first diameter, and disposed below the first upper frame, and surrounding the first evaporation tube; a plurality of first connectors for connecting the first upper frame and the first lower frame to each other, wherein the plurality of first connectors are spaced apart from each other, wherein the plurality of first connectors together with the first upper frame and the first lower frame press against the first evaporation tube; and a plurality of second guide protrusions protruding from each of the first connectors to support the second evaporation tube.

In one implementation of the apparatus, the outer cage includes: a second upper frame having a circular ring shape of a second diameter and surrounding the second evaporation tube; a second lower frame having a circular ring shape of the second diameter, and surrounding the second evaporation tube, and disposed below the second upper frame; and a plurality of second connectors for connecting the second upper frame and the second lower frame to each other, wherein the plurality of second connectors are spaced apart from each other, wherein the plurality of second connectors together with the second upper frame and the second lower frame press against the second evaporation tube.

In one implementation of the apparatus, the outer cage further includes a middle frame having a circular ring shape having the second diameter, wherein the middle frame surrounds the second evaporation tube, is disposed between the second upper frame and the second lower frame, and is coupled to the second upper frame and the second lower frame via the second connectors.

In one implementation of the apparatus, the water vapor discharge space includes a first space directly connected to a water vapor outlet and a second space located below the first space for temporarily storing therein water, wherein the second space is defined by the second partitioning portion, wherein the apparatus further comprises a temperature sensor coupled to an outer face of a portion of the chamber corresponding to the second space to measure a temperature inside the chamber.

In one implementation of the apparatus, the water vapor discharge space includes a first space directly connected to a water vapor outlet and a second space located below the first space for temporarily storing therein water, wherein the second space is defined by the second partitioning portion, wherein the apparatus further comprises a liquid water sensor disposed in the second space for detecting liquid water present in the second space.

A second aspect of the present disclosure provides a fuel cell system comprising: a water vapor generating apparatus for converting liquid water provided from a water supply device into water vapor; a fuel reformer for reacting hydrocarbon fuel with the water vapor provided from the water vapor generating apparatus to generate fuel gas containing hydrogen; and a fuel cell stack for generating electricity using the fuel gas provided from the fuel reformer and air provided from an external air supply, wherein the water vapor generating apparatus includes: a chamber having an inner space defined therein; a space partitioning member including a first partitioning portion coupled to a sidewall of the chamber and having an opening formed in a middle portion thereof, and a second partitioning portion extending downwardly from the opening, wherein the space partitioning member divides the inner space into a water vapor discharge space and a heating space; a first evaporation tube disposed in the heating space and in a coil shape surrounding the second partitioning portion, wherein the first evaporation tube has a first end disposed outside the chamber and connected to a water supply device and a second end positioned in the water vapor discharge space; a second evaporation tube disposed in the heating space and in a coil shape surrounding the first evaporation tube, wherein the second evaporation tube has a third end connected to the water supply device and a fourth end positioned in the water vapor discharge space; an inner cage disposed between the first evaporation tube and the second evaporation tube, wherein the inner cage presses against the first evaporation tube toward the second partitioning portion; and an outer cage surrounding the second evaporation tube, wherein the outer cage presses against the second evaporation tube toward the first evaporation tube, wherein the chamber has a water vapor outlet for connecting the water vapor discharge space to the fuel reformer.

In one implementation of the system, the system further comprises a burner for combusting gas discharged from the fuel cell stack to produce hot gas and supplying the hot gas to the heating space.

In one implementation of the system, the first evaporation tube or the second evaporation tube is embodied as a bellows-type tube.

In one implementation of the system, the apparatus further comprises a water vapor pressure-change reduction member disposed inside the first evaporation tube or the second evaporation tube and having a porous structure through which water vapor passes.

In one implementation of the system, the space partitioning member further includes a plurality of first guide protrusions protruding from a surface of the second partitioning portion to support the first evaporation tube.

In one implementation of the system, the inner cage includes: a first upper frame having a circular ring shape of a first diameter and surrounding the first evaporation tube; a first lower frame having a circular ring shape of the first diameter, and disposed below the first upper frame, and surrounding the first evaporation tube; a plurality of first connectors for connecting the first upper frame and the first lower frame to each other, wherein the plurality of first connectors are spaced apart from each other, wherein the plurality of first connectors together with the first upper frame and the first lower frame press against the first evaporation tube; and a plurality of second guide protrusions protruding from each of the first connectors to support the second evaporation tube.

In one implementation of the system, the outer cage includes: a second upper frame having a circular ring shape of a second diameter and surrounding the second evaporation tube; a second lower frame having a circular ring shape of the second diameter, and surrounding the second evaporation tube, and disposed below the second upper frame; and a plurality of second connectors for connecting the second upper frame and the second lower frame to each other, wherein the plurality of second connectors are spaced apart from each other, wherein the plurality of second connectors together with the second upper frame and the second lower frame press against the second evaporation tube.

In one implementation of the system, the outer cage further includes a middle frame having a circular ring shape having the second diameter, wherein the middle frame surrounds the second evaporation tube, is disposed between the second upper frame and the second lower frame, and is coupled to the second upper frame and the second lower frame via the second connectors.

In one implementation of the system, the water vapor discharge space includes a first space directly connected to a water vapor outlet and a second space located below the first space for temporarily storing therein water, wherein the second space is defined by the second partitioning portion, wherein the apparatus further comprises a temperature sensor coupled to an outer face of a portion of the chamber corresponding to the second space to measure a temperature inside the chamber.

In one implementation of the system, the water vapor discharge space includes a first space directly connected to a water vapor outlet and a second space located below the first space for temporarily storing therein water, wherein the second space is defined by the second partitioning portion, wherein the apparatus further comprises a liquid water sensor disposed in the second space for detecting liquid water present in the second space.

According to the water vapor generating apparatus of the present disclosure, the first and second evaporation tubes are not directly connected to the fuel reformer, but are connected to the fuel reformer through the water vapor discharge space of the chamber. Thus, the water vapor may be more uniformly supplied to the fuel reformer. In a conventional water vapor generating apparatus, in general, an external water supply device supplies water to an evaporation tube using a pump device, and the evaporation tube is directly connected to the fuel reformer. In this case, the water vapor is non-uniformly supplied to the fuel reformer due to pulsation of the pump device. However, in accordance with the present disclosure, the first and second evaporation tubes are connected to the fuel reformer through the water vapor discharge space of the chamber, such that the water vapor discharge space may dampen the pulsation of the pump device.

In addition, when the bellows-type tube is used as each of the first and second evaporation tubes, the water vapor generation efficiency may be improved, and the pressure-change of the water vapor to be supplied to the fuel reformer may be further reduced. Furthermore, when the water vapor pressure-change reduction member is disposed in each of the first and second evaporation tubes, the pressure-change of the water vapor to be supplied to the fuel reformer may be further reduced.

Moreover, according to the water vapor generating apparatus of the present disclosure, the first and second evaporation tubes may be fixed using the inner cage and the outer cage. Thus, structural stability of the water vapor generating apparatus may be improved, and a diameter of each of the evaporation tubes may be reduced, thereby further improving the water vaporization efficiency.

Moreover, the effect of the present disclosure is not limited to the above effects. It should be understood to include all possible effects derived from descriptions of the present disclosure or a configuration as set forth in the claims.

DETAILED DESCRIPTION OF THE INVENTION

For simplicity and clarity of illustration, elements in the drawings are not necessarily drawn to scale. The same reference numbers in different drawings denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Water Vapor Generating Apparatus

Figure 1:
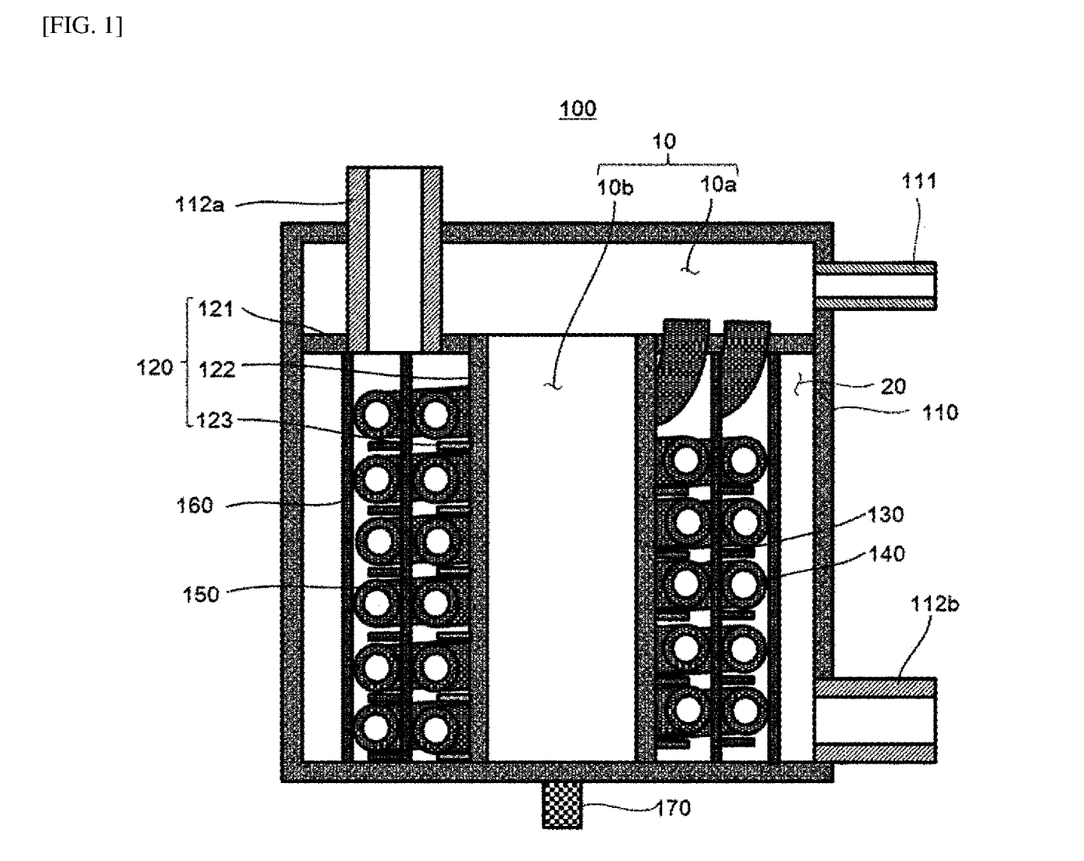
FIG. 1 is a cross-sectional view for illustrating a water vapor generating apparatus according to an embodiment of the present disclosure.
Figure 2:
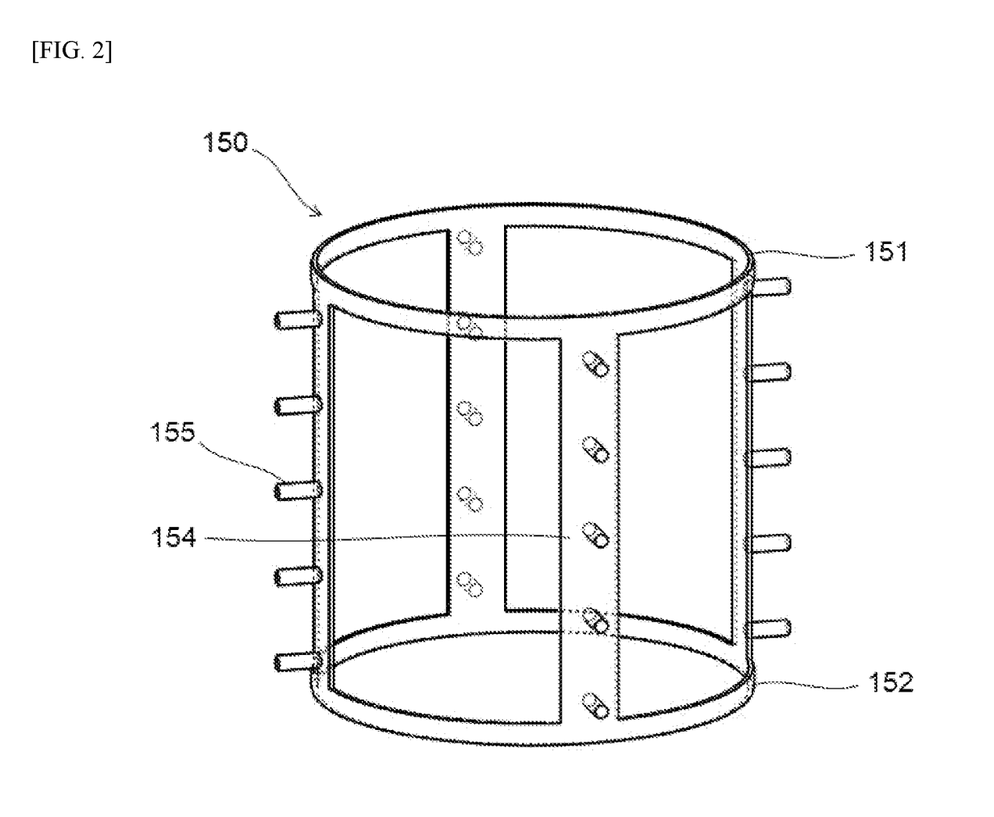
FIGS. 2 and 3 are perspective views for illustrating one embodiment of an inner cage and an outer cage shown in FIG. 1, respectively.
Figure 3:
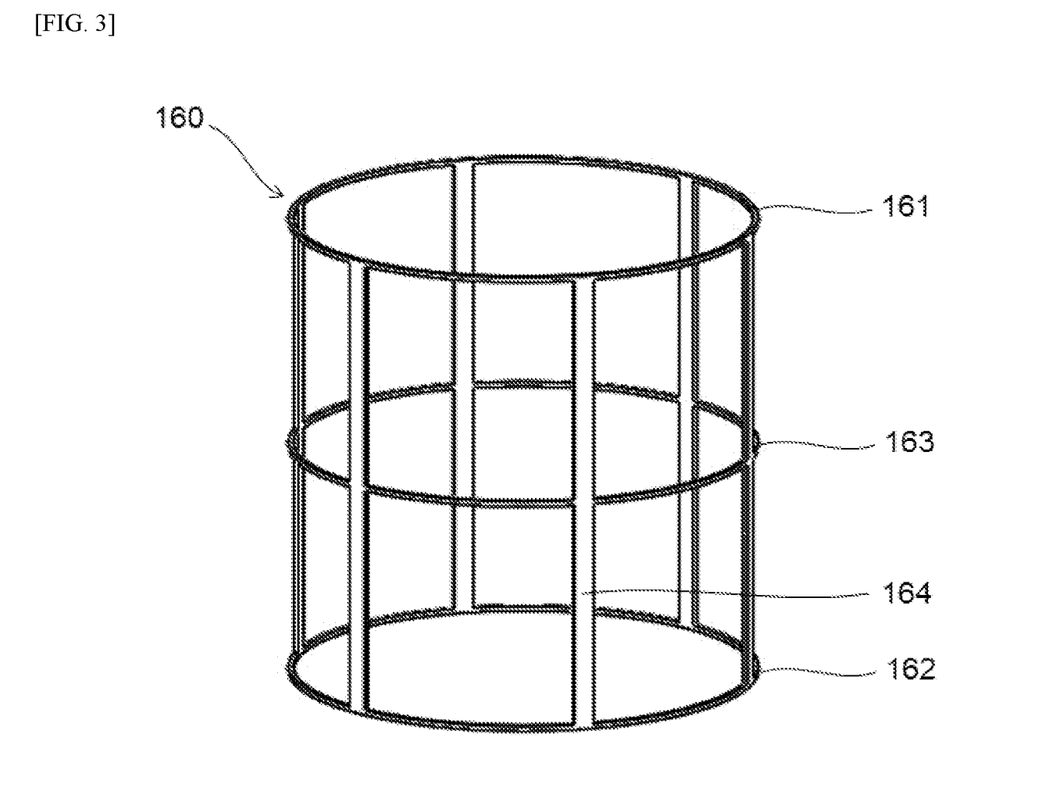

FIG. 1 is a cross-sectional view for illustrating a water vapor generating apparatus according to an embodiment of the present disclosure. FIGS. 2 and 3 are perspective views for illustrating one embodiment of an inner cage and an outer cage shown in FIG. 1, respectively.

Figure 4:
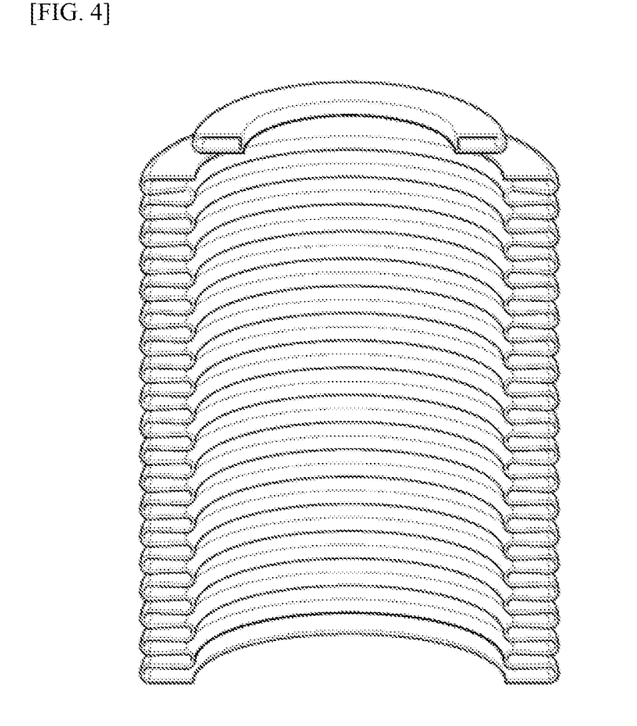
FIG. 4 is a cross-sectional perspective view for illustrating an embodiment of each of first and second evaporation tubes shown in FIG. 1.
Figure 5:
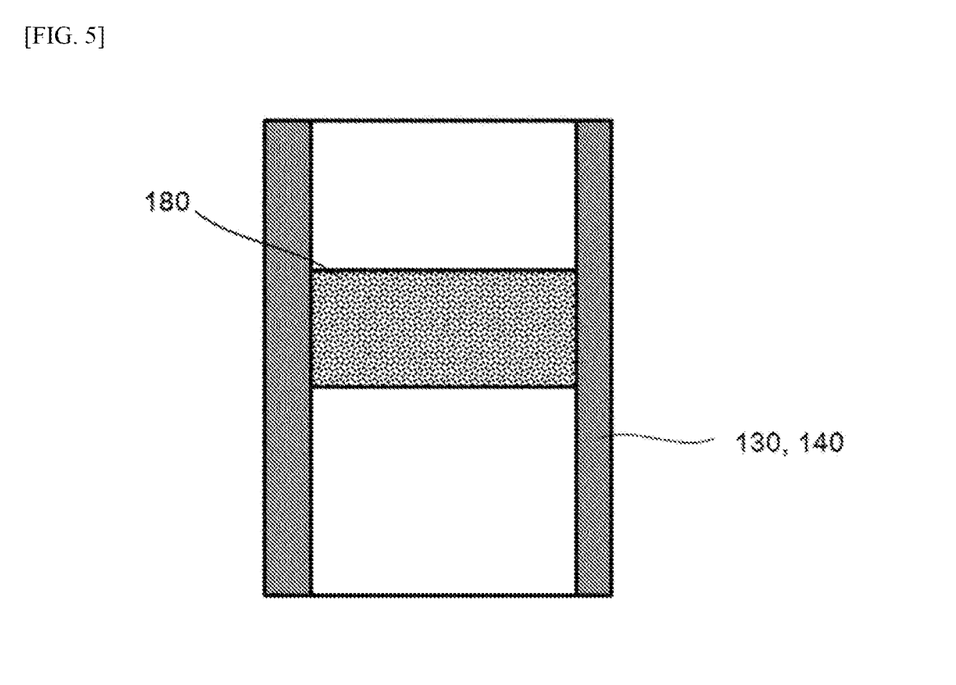
FIG. 5 is a cross-sectional view for illustrating a water vapor pressure-change reduction member according to an embodiment of the present disclosure.

FIG. 4 is a cross-sectional perspective view for illustrating an embodiment of each of first and second evaporation tubes shown in FIG. 1. FIG. 5 is a cross-sectional view for illustrating a water vapor pressure-change reduction member according to an embodiment of the present disclosure.

Referring to FIG. 1 to FIG. 5, a water vapor generating apparatus 100 according to an embodiment of the present disclosure may provide water vapor to a fuel reformer (1200 in FIG. 6) which generates hydrogen necessary for reaction of a fuel cell from hydrocarbon fuel chemically containing hydrogen, such as methane ($CH_4$), ethane ($C_2H_6$), propane ($C_3H_8$), butane ($C_4H_{10}$), natural gas, or coal gas. In one embodiment, when methane ($CH_4$) is supplied as the hydrocarbon fuel, the fuel reformer 1200 reacts the methane with the water vapor supplied from the water vapor generating apparatus 100 (1100 in FIG. 6) according to a following Reaction Formula 1 to generate the hydrogen:

$$3CH_4+4H_2O \rightarrow 10H_2+2CO+CO_2 \quad \text{Reaction Formula 1}$$

Together with this reaction, a side reaction to produce carbon (C) according to a following Reaction Formula 2 may occur inside the fuel reformer (1200 in FIG. 6) depending on a reaction temperature and a ratio of a contents of the water vapor and a carbon component:

$$2CO \rightarrow C+CO_2 \quad \text{Reaction Formula 2}$$

When the carbon generated in this way is supplied to a fuel cell stack (1300 in FIG. 6), an fuel electrode of the fuel cell may be damaged such that performance of the fuel cell may be drastically reduced. Therefore, in order to suppress such a side reaction for producing the carbon, the water vapor should be stably supplied to the fuel reformer.

The water vapor generating apparatus 100 according to an embodiment of the present disclosure includes a chamber 110, a space partitioning member 120, a first evaporation tube 130, a second evaporation tube 140, an inner cage 150, an outer cage 160 and a heating device (not shown).

The chamber 110 may have internal spaces 10 and 20. The space partitioning member 120 is disposed inside the chamber 110 to divide an internal space of the chamber 110 into two spaces 10 and 20, that is, a water vapor discharge space 10 and a heating space 20. A water vapor outlet 111 through which water vapor is discharged may be formed in a portion of the chamber 110 defining the water vapor discharge space 10. This water vapor outlet 111 may be connected to the fuel reformer (1200 in FIG. 6).

The chamber 110 and the space partitioning member 120 may be made of a material stable at a high temperature. For example, each of the chamber 110 and the space partitioning member 120 may be independently made of a material that is stable at a high temperature such as a metal, an alloy, a ceramic, a metal composite, or a composite of a metal and a ceramic. In one example, the chamber 110 and the space partitioning member 120 may be made of the same material or may be made of different materials.

In one embodiment, the water vapor discharge space 10 may include a first space 10a directly connected to the water vapor outlet 111 and a second space 10b located below the first space 10a for temporarily storing therein water which has not changed into water vapor or is generated by cooling the water vapor. The water stored in the second space 10b may be converted into the water vapor using thermal energy supplied to the heating space 20. In order to effectively supply the thermal energy provided to the heating space 20 to the water stored in the second space 10b, the second space 10b may have a top connected to the first space 10a and a side and/or a bottom which are surrounded with the heating space 20. A shape of the second space 10b is not particularly limited as long as the space 10b may accommodate therein the water and effectively receive the thermal energy from the heating space 20. For example, the second space 10b may have a cylindrical shape, a quadrangular prism, a cone, a quadrangular pyramid, and the like whose side faces are surrounded with the heating space 20.

In one embodiment, in order to define the first space 10 and the second space 20, the space partitioning member 120 may include a first partitioning portion 121 and a second partitioning portion 122. The first partitioning portion 121 may have an opening having a predetermined shape and defined in a middle partition thereof and may be coupled to a sidewall of the chamber 110 and may separate the first space 10a and the heating space 20 from each other. The second partitioning portion 122 may extend downward from the opening of the first partitioning portion 121 to define the second space 10b, and may separate the second space 10b and the heating space 20 from each other.

In an embodiment, the space partitioning member 120 may include a plurality of first guide protrusions 123 protruding from a surface of the second partitioning portion 122 toward the first evaporation tube 130. Each of the first guide protrusions 123 may support a bottom of each of portions of the first evaporation tube 130 to guide a coupling position of the first evaporation tube 130.

The first evaporation tube 130 may be disposed in the heating space 20 and in a form of a coil surrounding the second space 10b. The first evaporation tube 130 may have a first end disposed outside the chamber 110 and connected to an external water supply device (not shown) and a second end positioned within the water vapor discharge space 10. The first evaporation tube 130 may extend through the heating space 20 in the same manner as described above and may extend to the water vapor discharge space 10.

The second evaporation tube 140 may be disposed in a coil shape surrounding an outer face of the first evaporation tube 130. The second evaporation tube 140 may include a first end disposed outside the chamber 110 and connected to the water supply device and a second end located in the water vapor discharge space 10. The second evaporation tube 140 may extend through the heating space 20 in the same manner as described above and may extend to the water vapor discharge space 10.

When the first and second evaporation tubes 130 and 140 are installed as described above, the water supplied to the first and second evaporation tubes 130 and 140 from the external water supply device may be converted into water vapor while moving in the heating space 20. Then, the converted water vapor may be discharged into the water vapor discharge space 10. In addition, the water vapor discharged from the first and second evaporation tubes 130 and 140 into the water vapor discharge space 10 may be supplied to the fuel reformer (1200 in FIG. 6) through the water vapor outlet 111. Further, in accordance with the present disclosure, when two or more evaporation tubes are applied instead of a single evaporation tube, a diameter of each evaporation tube may be reduced, so that the water vapor conversion efficiency may be remarkably improved.

In one embodiment, each of the first and second evaporation tubes 130 and 140 may include a bellows-type tube having a wrinkled inner face as shown in FIG. 4. When each of the first and second evaporation tubes 130 and 140 is formed as the bellows type tube, water may be converted into water vapor at higher efficiency, and change in the pressure of the water vapor discharged from the first and second evaporation tubes 130 and 140 may be reduced, due to increase of a surface area resulting from the inner wrinkles of each of the first and second evaporation tubes 130 and 140.

The inner cage 150 may be disposed between the first evaporation tube 130 and the second evaporation tube 140, and may press against the first evaporation tube 130 toward the second partitioning portion 122 of the space partitioning member 120 defining the second space 10b to fix the first evaporation tube 130 and to support the second evaporation tube 140.

In one embodiment, as shown in FIG. 2, the inner cage 150 may include a first upper frame 151, a first lower frame 152, a plurality of first connectors 154, and a plurality of second guide protrusions 155.

Each of the first upper frame 151 and the first lower frame 152 may have a circular ring shape and have a constant width, and may surround and press the first evaporation tube 130. The first lower frame 152 may be disposed below the first upper frame 151 and may have the same diameter as that of the first upper frame 151.

The plurality of first connectors 154 may connect the first upper frame 151 and the first lower frame 152 to each other, and may be spaced apart from each other. The plurality of first connectors 154 together with the first upper frame 151 and the first lower frame 152 may press against the first evaporation tube 130.

The plurality of second guide protrusions 155 may protrude from each of the plurality of first connectors 154 in an outward direction, that is, toward the outer cage 160, and may support the second evaporation tube 140. A spacing between and a protrusion length of the plurality of second guide protrusions 155 may be appropriately adjusted according to the diameter of the second evaporation tube 140.

The outer cage 160 may surround the second evaporation tube 140, and may press against the second evaporation tube 140 toward the first evaporation tube 130 to fix the second evaporation tube 140.

In one embodiment, as shown in FIG. 3, the outer cage 160 may include a second upper frame 161, a second lower frame 162, a middle frame 163, and a plurality of second connectors 164.

Each of the second upper frame 161, the second lower frame 162, and the middle frame 163 may have a circular ring shape and have a constant width, and may surround and press against the second evaporation tube 140. The second lower frame 162 may be disposed below the second upper frame 161, and the middle frame 163 may be disposed between the second upper frame 161 and the second lower frame 162, all of which may have the same diameter.

The plurality of second connectors 164 may connect the second upper frame 161, the second lower frame 162, and the middle frame 163 to each other. The plurality of second connectors 164 together with the second upper frame 161, the second lower frame 162, and the middle frame 163 may press against the second evaporation tube 140 toward the first evaporation tube 130.

The heating device (not shown) may supply the thermal energy to the heating space 20 to convert water moving in and along the first and second evaporation tubes 130 and 140 into water vapor.

In one embodiment, the heating device may include a high-temperature gas supplier (1400 of FIG. 6) for supplying a high-temperature gas to the heating space. In this case, a gas inlet 112a into which the high-temperature gas is injected from the high-temperature gas supplier and a gas outlet 112b through which the high-temperature gas is discharged from the heating space 20 may be defined in a portion of the chamber 110 defining the heating space 20. As long as a temperature of the heating space 20 may be increased due to the high-temperature gas, the high-temperature gas is not particularly limited. For example, the high-temperature gas may include gas discharged from the fuel cell stack (1300 in FIG. 6). That is, the heating device may burn the gas discharged from the fuel cell stack using a burner (1400 of FIG. 2), etc. to produce the high-temperature gas and then supply the high-temperature gas through a blower or the like to the heating space 20.

In another embodiment, the heating device may include an electric heater (not shown) installed in a side wall of a portion of the chamber 110 defining the heating space 20.

In one embodiment, the water vapor generating apparatus 100 according to the embodiment of the present disclosure may further include a temperature sensor 170 coupled to a bottom of the second space 10b of the chamber 110 for measuring a temperature inside the chamber 110.

In one embodiment, as shown in FIG. 5, the water vapor generating apparatus 100 according to the embodiment of the present disclosure may further include a water vapor pressure-change reduction member 180 disposed inside each of the first and second evaporation tubes 130 and 140 to reduce the pressure-change of the water vapor to be discharged from each of the first and second evaporation tubes 130 and 140.

The water vapor pressure-change reduction member 180 may be disposed in each of the first and second evaporation tubes 130 and 140 and adjacent to an end of each of the first and second evaporation tubes 130 and 140 from which the water vapor is discharged, and may have a porous structure through which water vapor may pass. For example, the water vapor pressure-change reduction member 180 may include a mesh structure or a foam structure inserted and disposed inside each of the first and second evaporation tubes 130 and 140. This water vapor pressure-change reduction member 180 may suppress the pressure change of the water vapor due to the LeidenFrost effect.

Further, in one embodiment, the water vapor generating apparatus 100 according to an embodiment of the present disclosure may further include a liquid water detector (not shown) disposed in the second space 10b to detect liquid water present in the second space 10b. As the liquid water is not converted into the water vapor in the evaporation tube 130 and is stored in the second space 10b due to an abnormal situation such as a decrease in the temperature of the high-temperature gas or a malfunction of the heating device, the water vapor may not be supplied to the fuel reformer (1200 in FIG. 2). Thus, as described above, a large amount of carbon may be produced to damage the fuel electrode of the fuel cell. The liquid water sensor may detect the liquid water present in the second space 10b and notify the occurrence of the above-described abnormal situation at an early stage, thereby remarkably improving the stability of the fuel cell system. When the liquid water present in the second space 10b may be sensed by the liquid water sensor, a configuration of the liquid water sensor is not particularly limited.

According to the water vapor generating apparatus of the present disclosure, the first and second evaporation tubes 130 and 140 are not directly connected to the fuel reformer, but are connected to the fuel reformer (1200 in FIG. 6) through the water vapor discharge space 10 of the chamber 110. Thus, the water vapor may be more uniformly supplied to the fuel reformer. In a conventional water vapor generating apparatus, in general, an external water supply device (not shown) supplies water to an evaporation tube using a pump device, and the evaporation tube is directly connected to the fuel reformer. In this case, the water vapor is non-uniformly supplied to the fuel reformer due to pulsation of the pump device. However, in accordance with the present disclosure, the first and second evaporation tubes are connected to the fuel reformer through the water vapor discharge space of the chamber, such that the water vapor discharge space may dampen the pulsation of the pump device.

In addition, when the bellows-type tube is used as each of the first and second evaporation tubes, the water vapor generation efficiency may be improved, and the pressure-change of the water vapor to be supplied to the fuel reformer may be further reduced. Furthermore, when the water vapor pressure-change reduction member is disposed in each of the first and second evaporation tubes, the pressure-change of the water vapor to be supplied to the fuel reformer may be further reduced.

Moreover, according to the water vapor generating apparatus of the present disclosure, the first and second evaporation tubes may be fixed using the inner cage and the outer cage. Thus, structural stability of the water vapor generating apparatus may be improved, and a diameter of each of the evaporation tubes may be reduced, thereby further improving the water vaporization efficiency.

Fuel Cell System

Figure 6:
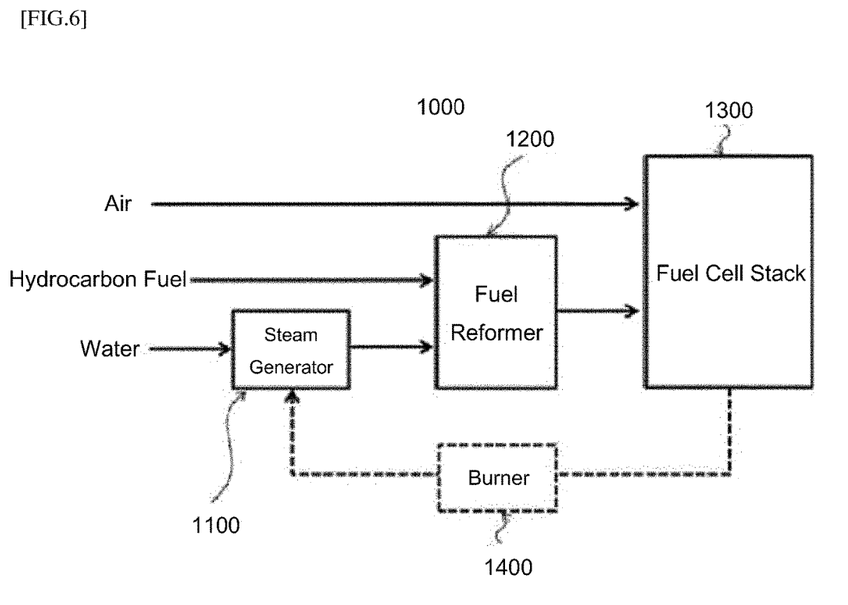
FIG. 6 is a view for illustrating a fuel cell system according to an embodiment of the present disclosure.

FIG. 6 is a view for illustrating a fuel cell system according to an embodiment of the present disclosure.

Referring to FIG. 6, the fuel cell system 1000 according to an embodiment of the present disclosure may include the water vapor generating apparatus 1100, the fuel reformer 1200 and the fuel cell stack 1300.

The water vapor generating apparatus 1100 receives liquid water from an external water supply device (not shown), converts the liquid water into the water vapor, and supplies the water vapor to the fuel reformer 1200. The water vapor generating apparatus 100 as described with reference to FIG. 1 may be applied as the water vapor generating apparatus 1100. Thus, a redundant detailed description thereof will be omitted.

The fuel reformer 1200 may generate fuel gas containing hydrogen via reaction between the hydrocarbon fuel supplied from an external fuel supply device (not shown) and the water vapor supplied from the water vapor generating apparatus 1100. A known or to be developed fuel reformer may be applied as the fuel reformer 1200 without limitation. Thus, a detailed description thereof will be omitted.

The fuel cell stack 1300 may generate electricity using the hydrogen of the fuel gas provided from the fuel reformer 1200 and oxygen of air provided from an external air supply device (not shown). The fuel cell stack 1300 may include a solid oxide type fuel cell stack, a solid polymer type fuel cell stack, a phosphate type fuel cell stack, a molten carbonate type fuel cell stack, etc. without limitation.

In the fuel cell system 1000 according to an embodiment of the present disclosure, the heating device of the water vapor generating apparatus 1100 may include a burner 1400 as shown in FIG. 6.

The burner 1400 may combust the gas discharged from the fuel cell stack 1300 to produce the high-temperature gas and supply the as a high-temperature gas to the heating space 20 of the water vapor generating apparatus 1100. Further, the burner 1400 may supply thermal energy required for the reaction of the hydrocarbon fuel and the water vapor to the fuel reformer 1200. A known combustion device may be applied as the burner 1400 without limitation.

Figure 7A:
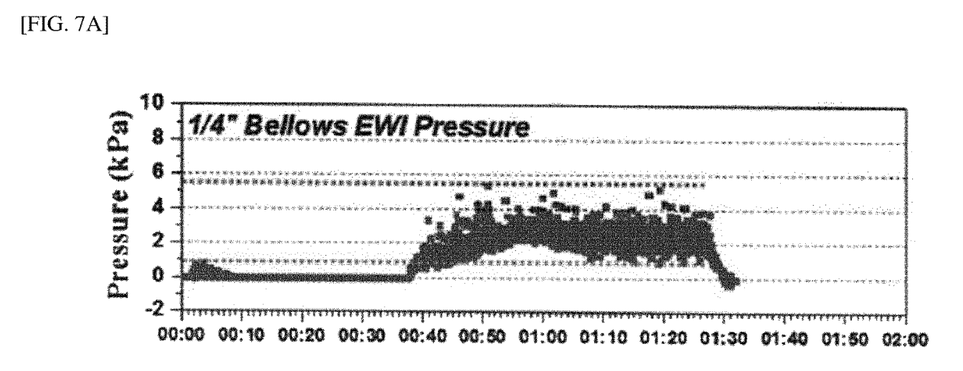
FIG. 7A and FIG. 7B are graphs showing pressure-changes measured in water vapor generating apparatus to which a flat tube type evaporation tube and a bellows type evaporation tube are applied, respectively.
Figure 7B:
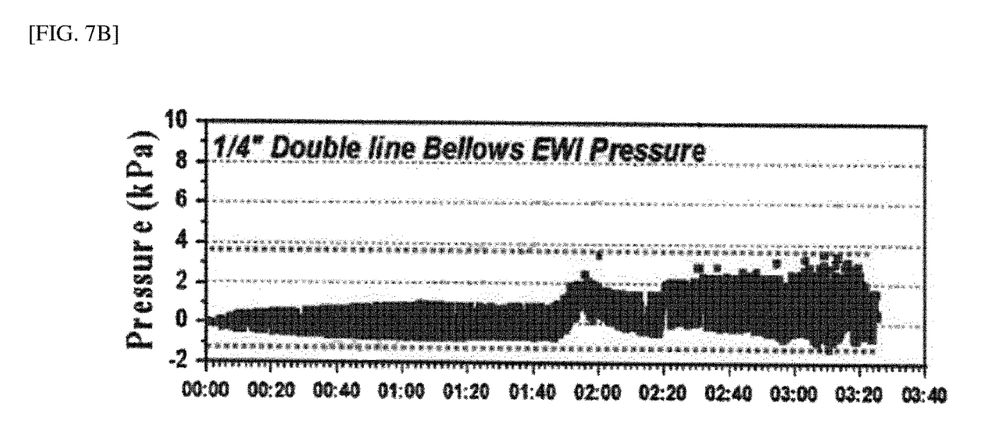

FIG. 7A and FIG. 7B are graphs showing pressure-changes measured in water vapor generating apparatuses to which a flat tube type evaporation tube and a bellows type evaporation tube are applied, respectively.

Referring to FIG. 7A and FIG. 7B, a maximum pressure as measured in the water vapor generating apparatus to which the flat tube type evaporation tube was applied was 5.2 kPa, while a maximum pressure measured in the water vapor generating apparatus to which the bellows-type evaporation tube was applied was 3.7 kPa. That is, the maximum pressure as measured in the water vapor generating apparatus to which the bellows type evaporation tube was applied was reduced by about 1.5 kPa, compared to that in the water vapor generating apparatus to which the flat tube type evaporation tube was applied.

It will be understood that although the above disclosure has been described with reference to the preferred embodiment of the present disclosure, those skilled in the art may achieve modifications and changes thereto within a range that does not deviate from the spirit and scope of the present disclosure as described in the following claims.

What is claimed:

1. A water vapor generating apparatus comprising:
a chamber having an inner space defined therein;
a space partitioning member including a first partitioning portion coupled to a sidewall of the chamber and having an opening formed in a middle portion thereof, and a second partitioning portion extending downwardly from the opening, wherein the space partitioning member divides the inner space into a water vapor discharge space and a heating space;
a first evaporation tube disposed in the heating space and in a coil shape surrounding the second partitioning portion, wherein the first evaporation tube has a first end disposed outside the chamber and connected to a water supply device and a second end positioned in the water vapor discharge space;
a second evaporation tube disposed in the heating space and in a coil shape surrounding the first evaporation tube, wherein the second evaporation tube has a third end connected to the water supply device and a fourth end positioned in the water vapor discharge space;

an inner cage disposed between the first evaporation tube and the second evaporation tube, wherein the inner cage presses against the first evaporation tube toward the second partitioning portion; and an outer cage surrounding the second evaporation tube, wherein the outer cage presses against the second evaporation tube toward the first evaporation tube.

2. The apparatus of claim 1, wherein the first evaporation tube or the second evaporation tube is embodied as a bellows-type tube.

3. The apparatus of claim 1, wherein the apparatus further comprises a water vapor pressure-change reduction member disposed inside the first evaporation tube or the second evaporation tube and having a porous structure through which water vapor passes.

4. The apparatus of claim 1, wherein the space partitioning member further includes a plurality of first guide protrusions protruding from a surface of the second partitioning portion to support the first evaporation tube.

5. The apparatus of claim 1, wherein the inner cage includes:
a first upper frame having a circular ring shape of a first diameter and surrounding the first evaporation tube;
a first lower frame having a circular ring shape of the first diameter, and disposed below the first upper frame, and surrounding the first evaporation tube;
a plurality of first connectors for connecting the first upper frame and the first lower frame to each other, wherein the plurality of first connectors are spaced apart from each other, wherein the plurality of first connectors together with the first upper frame and the first lower frame press against the first evaporation tube; and
a plurality of second guide protrusions protruding from each of the first connectors to support the second evaporation tube.

6. The apparatus of claim 4, wherein the outer cage includes:
a second upper frame having a circular ring shape of a second diameter and surrounding the second evaporation tube;
a second lower frame having a circular ring shape of the second diameter, and surrounding the second evaporation tube, and disposed below the second upper frame; and
a plurality of second connectors for connecting the second upper frame and the second lower frame to each other, wherein the plurality of second connectors are spaced apart from each other, wherein the plurality of second connectors together with the second upper frame and the second lower frame press against the second evaporation tube.

7. The apparatus of claim 6, wherein the outer cage further includes a middle frame having a circular ring shape having the second diameter, wherein the middle frame surrounds the second evaporation tube, is disposed between the second upper frame and the second lower frame, and is coupled to the second upper frame and the second lower frame via the second connectors.

8. The apparatus of claim 1, wherein the water vapor discharge space includes a first space directly connected to a water vapor outlet and a second space located below the first space for temporarily storing therein water, wherein the second space is defined by the second partitioning portion,
wherein the apparatus further comprises a temperature sensor coupled to an outer face of a portion of the chamber corresponding to the second space to measure a temperature inside the chamber.

9. The apparatus of claim 1, wherein the water vapor discharge space includes a first space directly connected to a water vapor outlet and a second space located below the first space for temporarily storing therein water, wherein the second space is defined by the second partitioning portion,
wherein the apparatus further comprises a liquid water sensor disposed in the second space for detecting liquid water present in the second space.

10. A fuel cell system comprising:
a water vapor generating apparatus for converting liquid water provided from a water supply device into water vapor;
a fuel reformer for reacting hydrocarbon fuel with the water vapor provided from the water vapor generating apparatus to generate fuel gas containing hydrogen; and
a fuel cell stack for generating electricity using the fuel gas provided from the fuel reformer and air provided from an external air supply,
wherein the water vapor generating apparatus includes:
a chamber having an inner space defined therein;
a space partitioning member including a first partitioning portion coupled to a sidewall of the chamber and having an opening formed in a middle portion thereof, and a second partitioning portion extending downwardly from the opening, wherein the space partitioning member divides the inner space into a water vapor discharge space and a heating space;
a first evaporation tube disposed in the heating space and in a coil shape surrounding the second partitioning portion, wherein the first evaporation tube has a first end disposed outside the chamber and connected to a water supply device and a second end positioned in the water vapor discharge space;
a second evaporation tube disposed in the heating space and in a coil shape surrounding the first evaporation tube, wherein the second evaporation tube has a third end connected to the water supply device and a fourth end positioned in the water vapor discharge space;
an inner cage disposed between the first evaporation tube and the second evaporation tube, wherein the inner cage presses against the first evaporation tube toward the second partitioning portion; and
an outer cage surrounding the second evaporation tube, wherein the outer cage presses against the second evaporation tube toward the first evaporation tube,
wherein the chamber has a water vapor outlet for connecting the water vapor discharge space to the fuel reformer.

11. The system of claim 10, wherein the system further comprises a burner for combusting gas discharged from the fuel cell stack to produce hot gas and supplying the hot gas to the heating space.

* * * * *